T. NAUS.
TIRE RIM.
APPLICATION FILED JULY 23, 1914.
1,126,259. Patented Jan. 26, 1915.
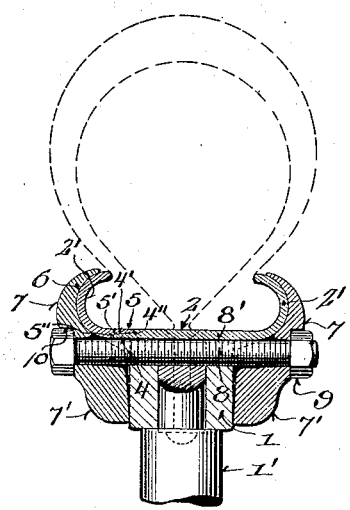
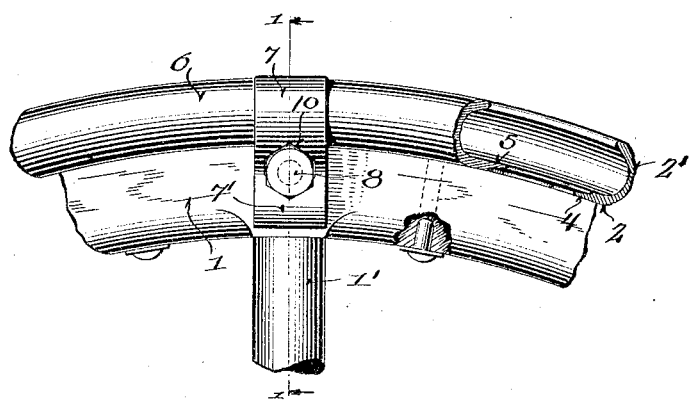

UNITED STATES PATENT OFFICE.

THEODORE NAUS, OF MILWAUKEE, WISCONSIN, ASSIGNOR OF FORTY-NINE ONE-HUNDREDTHS TO JOSEPH F. DEMERATH, OF MILWAUKEE, WISCONSIN.

TIRE-RIM.

1,126,259.   Specification of Letters Patent.   Patented Jan. 26, 1915.

Application filed July 23, 1914. Serial No. 852,543.

*To all whom it may concern:*

Be it known that I, THEODORE NAUS, a citizen of the United States, and resident of Milwaukee, in the county of Milwaukee and State of Wisconsin, have invented certain new and useful Improvements in Tire-Rims; and I do hereby declare that the following is a full, clear, and exact description thereof.

The primary object of my invention is to provide a simple, economical, durable and effective two-part wheel rim for tires, the same being especially adapted for use in connection with the clencher type of tire.

Specific objects of my invention are to provide means whereby a one piece standard rim may be converted into a two-part quick demountable rim without removing the rim body; to provide a metallic tread band member having one edge formed with a clencher bead and its opposite edge formed with an annularly shouldered tongue for engagement with the contemporary shouldered edge of a clencher ring member.

Heretofore wheel rims especially designed for the cheaper grade of vehicles have been made in one piece comprising a tread band having upturned beaded edges, which band portion is affixed to the wheel felly. To attach a resilient tire to rims of the above mentioned type it is necessary to spring the beaded edges of the tire over the corresponding beaded edges of the rim befor the assemblage is effected and this operation is not only exceedingly tedious and annoying, but requires the skill and strength to manipulate the parts and, in many instances, after such assemblage where an inner tube is used, it has been found that said inner tubes are pinched and consequently vitally injured. The same objectionable features have been found to exist in the more expensive three part demountable rims, which latter rims require special tools for manipulating the same.

My invention is designed to overcome all of the objectionable features mentioned by forming the rim in two parts as hereinafter shown and described, whereby a demountable beaded ring is provided having a slip joint connection with one edge of a tread band, the opposite edge being provided with an upturned bead. Hence the tire may be slipped upon the tread-band without expanding the same and thereafter the removable ring is pushed into place to effect a slip joint union with the rim band, said joint being effected by a simple movement without straining, whereby these parts are perfectly nested to form an uninterrupted smooth tread surface. The beaded ring member and the beaded tire band member are then clamped together by a series of companion clips, which clips are confined by bolts preferably passed through apertures in the wheel felly. By this bolting connection between the companion clips, the double clips or cleats draw the separable members tightly together to form a practically sealed joint and there is no consequent strain upon the felly should said felly be of the wood type and, as a matter of fact, the bolts serve to add strength to the felly, whereby the latter is held from bulging or splitting transversely.

With the above and other minor objects in view the invention consists in certain peculiarities of construction and combination of parts as set forth hereinafter with reference to the accompanying drawings and subsequently claimed.

In the drawings Figure 1 represents a cross-section of a fragment of a wheel equipped with a clencher rim embodying the features of my invention, the section being indicated by line 2—2 of Fig. 2, and Fig. 2, a face view of the same with parts broken away and in section to more clearly illustrate details of construction.

Referring by characters to the drawings, 1 represents a wood felly having spokes 1' extending therethrough, and secured to the face of the felly is a tread band 2 having an upturned annularly beaded edge 2' of the clencher type, the tread band being secured to the felly in the ordinary manner. The opposite edge of the tread-band projects slightly over the felly and is formed with an annular tongue 4, which tongue is provided with a slightly beveled upper face 4', the said upper face merging into a shoulder 4''. Thus the tongue is approximately one-half the thickness of the tire tread. This tongue is formed for engagement with a corresponding overlapping tongue 5, which tongue is formed at the base edge of a clencher ring 6, the same being a companion of and corresponds to the bead 2' of the tread band. The tongue 5, in connection with the base of the clencher ring, in every respect is similar to the tongue 4 with the exception that it is of greater diameter, whereby its inner beveled base 5′ is adapted to match the outer beveled face 4′ of the tread tongue. The ring tongue 5 is provided with a shoulder 5″, which shoulder is adapted to abut the outer edge of the tongue 4, whereby the companion tongues form a rabbet joint. In order that a standard rim may be converted into a two part rim such as described, said standard rim, while upon the wheel felly, can readily be subjected to a cutting operation to remove one of the clencher beads and, after such removal, the tongue 4 is formed by effecting a countersunk cut to form the shoulder 4″ and upper face 4′. After this operation a removable flange which is made standard having a tongue 5, is fitted to the tread band, as shown in Fig. 1. In order to bind the two parts of the rim firmly together, I provide companion clips 7, any number of sets of which may be fitted about the rim having concavo-convexed wings which conform to the clencher beads. The base 7′ of each clip is adapted to abut the side faces of the felly 1 and said base in each instance is apertured for the reception of a threaded clamping bolt 8. The bolts are passed through transverse channels 8′, which channels are preferably slightly smaller than the bolts, whereby said bolts are screwed into place through the wood to thus insure more perfect union and rigidity. The bolts, as shown, are preferably also passed through the tenons of the wheel spokes, whereby strength is added to the wheel structure. After the bolts are in place the clips are firmly drawn together by a retaining nut 9, which nut is in threaded union with one end of the bolt and engages the base of one of the clip members. As shown in Fig. 2, one clip member of each set is formed with a polygonal seat 10 for the reception of a correspondingly faced bolt head and hence after the bolt has been passed through the felly it can be driven home in such manner that its head will effect socket engagement with the clip referred to, whereby the bolt is held against twisting when the nut 9 is given a final turn to cause the wings of the clips to firmly draw the beaded rim members together, whereby the rabbet joint between said members is closed up and, in effect the rim member now becomes a unit.

It is obvious, owing to the fact that the inner face of each clip base is slightly oblique with relation to the juxtaposed face of the wheel felly, when drawn upon the clamping bolts is effected a leverage action is produced between the contacting lower end of the clip base and the wood felly, whereby the upper clamping wings of the clips will tend to draw the beaded edges of the rim toward each other and exert a slight downward pressure thereon.

Attention is called to the open felly channels 8′ for forming seats for the clamping bolts, whereby said bolts are positioned to abut the under side of the tread band, by means of which band they are thus confined in one direction. This construction also renders it possible to position the bolts in juxtaposition to the clamping wings, whereby the drawing efficiency is increased, the fulcrum points upon which the clips are rocked being at a considerable distance below the bolts.

I claim:

The combination of a wheel having a felly, a flat tread band of uniform thickness permanently secured to the felly, the tread band terminating with a clencher bead at one edge and an annular shouldered tongue at its opposite edge that projects for the most part beyond the juxtaposed side of said felly, the upper face of said tongue being inwardly beveled, a removable clencher ring of a thickness corresponding to the thickness of the tread having an inwardly extended base edge formed with a companion annular tongue having an outwardly beveled lower face for overlapping engagement with the corresponding beveled face of the tread band tongue, and means for clamping the removable clencher rings to said tread band.

In testimony that I claim the foregoing I have hereunto set my hand at Milwaukee in the county of Milwaukee and State of Wisconsin in the presence of two witnesses.

THEODORE NAUS.

Witnesses:
 GEO. W. YOUNG,
 M. E. DOWNEY.